(12) United States Patent
Bahrami et al.

(10) Patent No.: US 11,886,865 B2
(45) Date of Patent: Jan. 30, 2024

(54) ENHANCED DATA PROVISION IN A DIGITAL NETWORK

(71) Applicant: Ford Global Technologies, LLC, Dearborn, MI (US)

(72) Inventors: Mohsen Bahrami, Troy, MI (US); Navid Tafaghodi Khajavi, Troy, MI (US); Amin Ariannezhad, Troy, MI (US); Elnaz Tavakoli Yazdi, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 17/233,946

(22) Filed: Apr. 19, 2021

(65) Prior Publication Data
US 2022/0334827 A1    Oct. 20, 2022

(51) Int. Cl.
*G06F 8/654* (2018.01)
*H04L 67/06* (2022.01)
*H04L 67/12* (2022.01)

(52) U.S. Cl.
CPC .............. *G06F 8/654* (2018.02); *H04L 67/06* (2013.01); *H04L 67/12* (2013.01)

(58) Field of Classification Search
CPC .......... G06F 8/654; H04L 67/06; H04L 67/12
See application file for complete search history.

(56) References Cited

U.S. PATENT DOCUMENTS

| | | | |
|---|---|---|---|
| 6,401,239 B1* | 6/2002 | Miron | G06F 8/658 707/999.203 |
| 2004/0158817 A1* | 8/2004 | Okachi | G06F 8/65 717/122 |
| 2004/0243675 A1* | 12/2004 | Taoyama | H04L 67/34 709/219 |
| 2006/0075007 A1* | 4/2006 | Anderson | G06F 3/0608 |
| 2006/0294514 A1* | 12/2006 | Bauchot | G06F 8/65 717/173 |
| 2009/0327918 A1* | 12/2009 | Aaron | H04L 67/104 709/204 |

(Continued)

FOREIGN PATENT DOCUMENTS

| DE | 102012001047 A1 | 7/2013 |
|---|---|---|
| JP | 2018018307 A | 2/2018 |

(Continued)

*Primary Examiner* — Wei Y Zhen
*Assistant Examiner* — Brahim Bourzik
(74) *Attorney, Agent, or Firm* — Brandon Hicks; Bejin Bieneman PLC (57) ABSTRACT

A system includes a server computer programmed upon determining that a first portion of software data for updating an operational feature of a first computer is stored in the first computer and a second portion of the software data is stored in a second computer, to encode the first portion and the second portion to generate encoded data, and to send the encoded data via wireless data transfer to the first and second computers. The first computer is programmed to decode the second portion from the received encoded data, to update the operational feature of the first computer based on the stored first portion and the decoded second portion, and to operate the first computer based on the updated operational feature.

17 Claims, 5 Drawing Sheets

(56) References Cited

U.S. PATENT DOCUMENTS

| | | | | |
|---|---|---|---|---|
| 2014/0245284 A1* | 8/2014 | Alrabady | ................ | G06F 8/658 |
| | | | | 717/173 |
| 2017/0177325 A1* | 6/2017 | Carranza | ................ | G06F 8/658 |
| 2019/0210545 A1 | 7/2019 | Sangameswaran et al. | | |
| 2020/0314434 A1* | 10/2020 | Li | ........................ | H04N 19/196 |

FOREIGN PATENT DOCUMENTS

| | | | | |
|---|---|---|---|---|
| KR | 101538331 B1 | 7/2015 | | |
| WO | WO-2021089975 A1 * | 5/2021 | ........... | G06F 21/572 |

\* cited by examiner

ENHANCED DATA PROVISION IN A DIGITAL NETWORK

BACKGROUND

A computer may be programmed or reprogrammed via software updates, e.g., to add or replace an operation of the computer. Software updates are typically (although not necessarily) performed in part wirelessly, e.g., as over the air (OTA) updates. However, network limitations including limitations of bandwidth and/or connectivity of wide-area networks such as cellular networks can be issues for OTA software updates.

DETAILED DESCRIPTION

Introduction

Disclosed herein is a system including a server computer, programmed, upon determining that a first portion of software data for updating an operational feature of a first computer is stored in the first computer and a second portion of the software data is stored in a second computer, to encode the first portion and the second portion to generate encoded data, to send the encoded data via wireless data transfer to the first and second computers. The first computer is programmed to decode the second portion from the received encoded data, to update the operational feature of the first computer based on the stored first portion and the decoded second portion, and to operate the first computer based on the updated operational feature.

The first computer may be in a first vehicle and the operational feature may be a vehicle operation feature.

The server computer may be further programmed to encode the first portion and the second portion by applying an XOR operation to the first portion and the second portion.

The server computer may be further programmed to upon determining that a first portion size differs from a second portion size, adjust at least one of the first and second portions by adding dummy data; and then encode the first portion and the second portion using the adjusted at least one of the first and second portion.

The server computer may be further programmed to send a third portion of software data to the first and second computers upon determining that each of the first and second computers lack the third portion.

The server computer may be further programmed to upon determining that (i) the first computer stores a third portion that is a portion of second software data for updating a second operational feature in a first computer memory, and (ii) the first computer memory lacks a space to store the second portion, transmit an instruction to the first computer to remove the third portion of the second software data from the first computer memory.

The server computer may be further programmed to upon determining that (i) the first computer stores a third portion that is a portion of second software data for updating a second operational feature in a first computer memory, and (ii) a software update plan does not specify an update of the second software data, send a message including an instruction to remove the third portion of the second software data from the first computer memory.

The first computer may be in a first vehicle, and the second computer is in a second vehicle.

Further disclosed herein is a server computer, comprising a processor and a memory. The memory stores instructions executable by the processor to upon determining that a first portion of software data for updating an operational feature of a first computer is stored in the first computer and a second portion of the software data is stored in a second computer, encode the first portion and the second portion to generate encoded data, and to send the encoded data via wireless data transfer to the first and second computers. The first computer is programmed to decode the second portion from the received encoded data and update the operational feature of the first computer based on the stored first portion and the decoded second portion.

The instructions may further include instructions to encode the first portion and the second portion by applying an XOR operation to the first portion and the second portion.

The instructions may further include instructions to upon determining that a first portion size differs from a second portion size, adjust at least one of the first and second portions by adding dummy data; and then encode the first portion and the second portion using the adjusted at least one of the first and second portion.

The instructions may further include instructions to send a third portion of software data to the first and second computers upon determining that each of the first and second computers lack the third portion.

The instructions may further include instructions to upon determining that (i) the first computer stores a third portion that is a portion of second software data for updating a second operational feature in a first computer memory, and (ii) the first computer memory lacks a space to store the second portion, transmit an instruction to the first computer to remove the third portion of the second software data from the first computer memory.

The instructions may further include instructions to upon determining that (i) the first computer stores a third portion that is a portion of second software data for updating a second operational feature in a first computer memory, and (ii) a software update plan does not specify an update of the second software data, send a message including an instruction to remove the third portion of the second software data from the first computer memory.

The first computer may be in a first vehicle, and the second computer may be in a second vehicle.

Further disclosed herein is a method, comprising upon determining that a first portion of software data for updating an operational feature of a first computer is stored in the first computer and a second portion of the software data is stored in a second computer, encoding, in a server computer, the first portion and the second portion to generate encoded data, sending, from the server computer, the encoded data via wireless data transfer to the first and second computers, decoding, in the first computer, the second portion from the received encoded data; updating the operational feature of the first computer based on the stored first portion and the decoded second portion; and operating the first computer based on the updated operational feature.

The encoding may include applying an XOR operation to the first portion and second portions of the software data.

The method may further include upon determining that a first portion size differs from a second portion size, adjusting at least one of the first and second portions by adding dummy data; and then encoding the first portion and the second portion using the adjusted at least one of the first and second portion.

The method may further include sending a third software portion of the software data to the first and second computers upon determining that each of the first and second computers lack the third portion.

The method may further include upon determining that (i) the first computer stores a third portion that is a portion of second software data for updating a second operational feature in a first computer memory, and (ii) the first computer memory lacks a space to store the second portion, transmitting an instruction to the first computer to remove the third portion of the second software data from the first computer memory.

Further disclosed is a computing device programmed to execute any of the above method steps.

Yet further disclosed is a computer program product, comprising a computer-readable medium storing instructions executable by a computer processor, to execute any of the above method steps.

System Elements

To increase efficiency of using a communication network for updating data on one or more computers connected to the network, e.g., updating software via an over the air (OTA) software update, and/or more efficient use of memory space in a computer receiving a data update, software data for an update can be divided into two or more portions. Then, a first portion of software data needed for an update may be stored at a first time in a memory of a first computer that is to receive the update. Then, at a second, later time, a server computer can determine one or more remaining portions of software data needed for the update, i.e., to provide new and/or modified programming to the first computer. The server computer can then determine whether a second computer in on a local network with the first computer includes a needed remaining second portion of software data for the update. Depending on this determination, as explained below, the server computer can transmit one or more remaining second portions to the first computer in a non-encoded format, an encoded format, or as a combination of non-encoded and encoded data, whereby an update can be accomplished with more efficient use of bandwidth and/or computer memory.

Logic for determining the portions of software data to provide in an update is described in detail below. As a general overview, in one example, the server computer can be programmed to determine that a first portion of software data for updating an operational feature of a first computer is stored in the first computer, and a second portion of the software data is stored in a second computer on a local network with the first computer, to encode the first portion and the second portion to generate encoded data, and to send the encoded data to the first and second computers. The first computer can be programmed to decode the second portion from the received encoded data, to update the operational feature of the first computer-based on the stored first portion and the decoded second portion, and to operate the first computer based on the updated operational feature.

Figure 1:
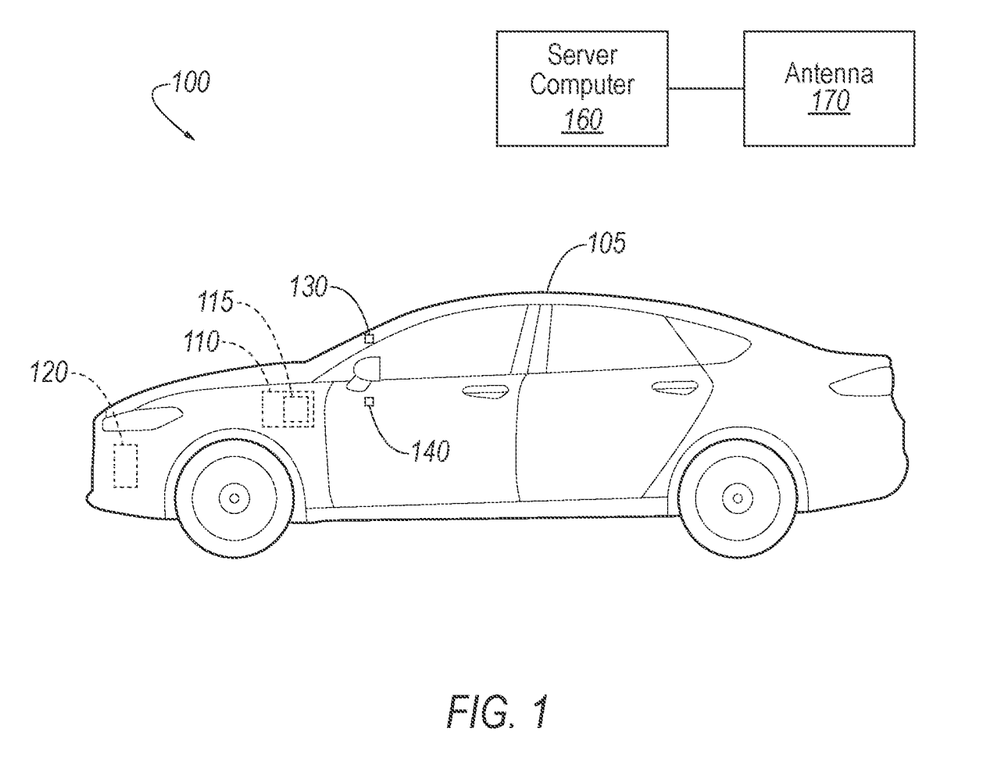
FIG. 1 is a block diagram of an exemplary system for providing data updates in a digital network.

FIG. 1 illustrates an example system 100 including vehicle(s) 105 and a server computer 160. Although FIG. 1 shows a vehicle 105, the system 100 typically includes a plurality, e.g., thousands, of vehicles 105. Further, although the system 100 is discussed and illustrated according to an example that includes updating a computer 110 in a vehicle 105, the system 100 could be implemented in a variety of contexts, i.e., additionally or alternatively, a system 100 could include the server computer 160 and one or more of computers 110 in a variety of different devices, machines, or architectures, e.g., a computer 110 could be included in a mobile robot, an aerial drone, an internet of things (IoT) device, etc., configured to communicate via a wireless communication network with the server computer 160.

The computer 110 includes a processor and a memory such as are known. The memory includes one or more forms of computer-readable media, and stores instructions executable by the computer 110 for performing various operations, including as disclosed herein. For example, a vehicle 105 that includes the computer 110 typically further includes actuators 120, sensors 130 such as active infrared sensor(s) 130, wireless communication interface 140, etc., and other components discussed below. The system 100 typically includes multiple computers 110 on a local network. For example, where the computers 110 are in a vehicle, the local network could be a vehicle network or communication bus such as a controller area network (CAN) bus. However, computers 110 could be joined on a variety of wired and/or wireless local networks, e.g., using Wi-Fi®, Ethernet, Zig-Bee®, etc. Herein, a local network or local area network (as opposed to a wide-area network) means a network that extends for a defined geographic space, e.g., a vehicle 105, a building, a limited outdoor area, etc. In a vehicle 105, a computer 110 may include programming to operate one or more of vehicle 105 brakes, propulsion (e.g., control of acceleration in the vehicle by controlling actuators 120 to control one or more of an internal combustion engine, electric motor, hybrid engine, etc.), steering, climate control, interior and/or exterior lights, etc. For example, the computer 110 can be a controller such as an electronic control unit (ECU) in a vehicle 105; thus, it will be understood that a computer 110 could be one of a plurality of computers 110 included in a machine such as a vehicle 105.

As mentioned above, a computer 110 may include or be communicatively coupled to one or more networks, e.g., a local network such as a vehicle communications bus (such as a controller area network (CAN) or the like), and/or to one or more other computers, e.g., other controllers or ECUs or the like in a vehicle 105 for monitoring and/or controlling various vehicle components or subsystems, e.g., the computer 110 could be a powertrain controller, a brake controller, a steering controller, a body control module, an engine control module, etc.

The computer 110 is capable of receiving data, directly or indirectly, via a wide area network, i.e., a network that includes elements, and connects to devices, that are geographically remote from the computer 110 and that are not part of a machine or system including the computer 110. Referring to the illustrated example, the vehicle 105 may include a communication interface 140 for wireless communications via a wide area network (i.e., a network that includes elements, and connects to devices, outside of the vehicle 105), i.e., for sending (i.e., transmitting) and receiving radio frequency (RF) communications, e.g., chips, antenna(s), transceiver(s), etc. The communication interface 140 may provide a long-wave communication mechanism based on exemplary V2X communication protocols such as cellular (e.g., CV2X), IEEE 802.11, dedicated short-range communications (DSRC), and/or wide area networks (WAN). The computer 110 may be configured for communicating through the wireless communication interface 140 with the server computer 160, other vehicles 105, etc., e.g., via a vehicle-to-vehicle (V2V), a vehicle-to-infrastructure (V-to-I) communication, and/or a vehicle-to-everything (V2X) communication network (i.e., communications that can include V2V and V2I).

A server computer 160 can include or be connected to a communication interface, e.g., including an antenna 170 for wireless communications. The computer 160 can communicate with a computer 110 via a wired and/or wireless communication network, e.g., via the antenna 170. The server computer 160 includes a processor and a memory such as are known. The memory includes one or more forms of computer-readable media, and stores instructions executable by the computer 160 for performing various operations, including as described herein. The computer 160 may be configured for communicating through the communication interface 140 that can include one or more antennas to provide wireless communications with other computers such as computers 110 via wireless protocols such as a V2X communication protocol, e.g., short-wave communication. Additionally or alternatively, a server computer 160 could be configured to communicate in part or entirely via wired communications with the computer 110. For example, the server computer 160 may be programmed to communicate via wires or cables included in a network infrastructure (e.g., included in the Internet), via Ethernet, etc. or any other wired communication with the computers 110.

Additionally or alternatively, computers 110, 160 may include a dedicated electronic circuit including an ASIC that is manufactured and/or configured for a particular operation, e.g., performing a specific operation in a vehicle 105, communicating with other computers 110, 160, etc. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging.

Figure 2:
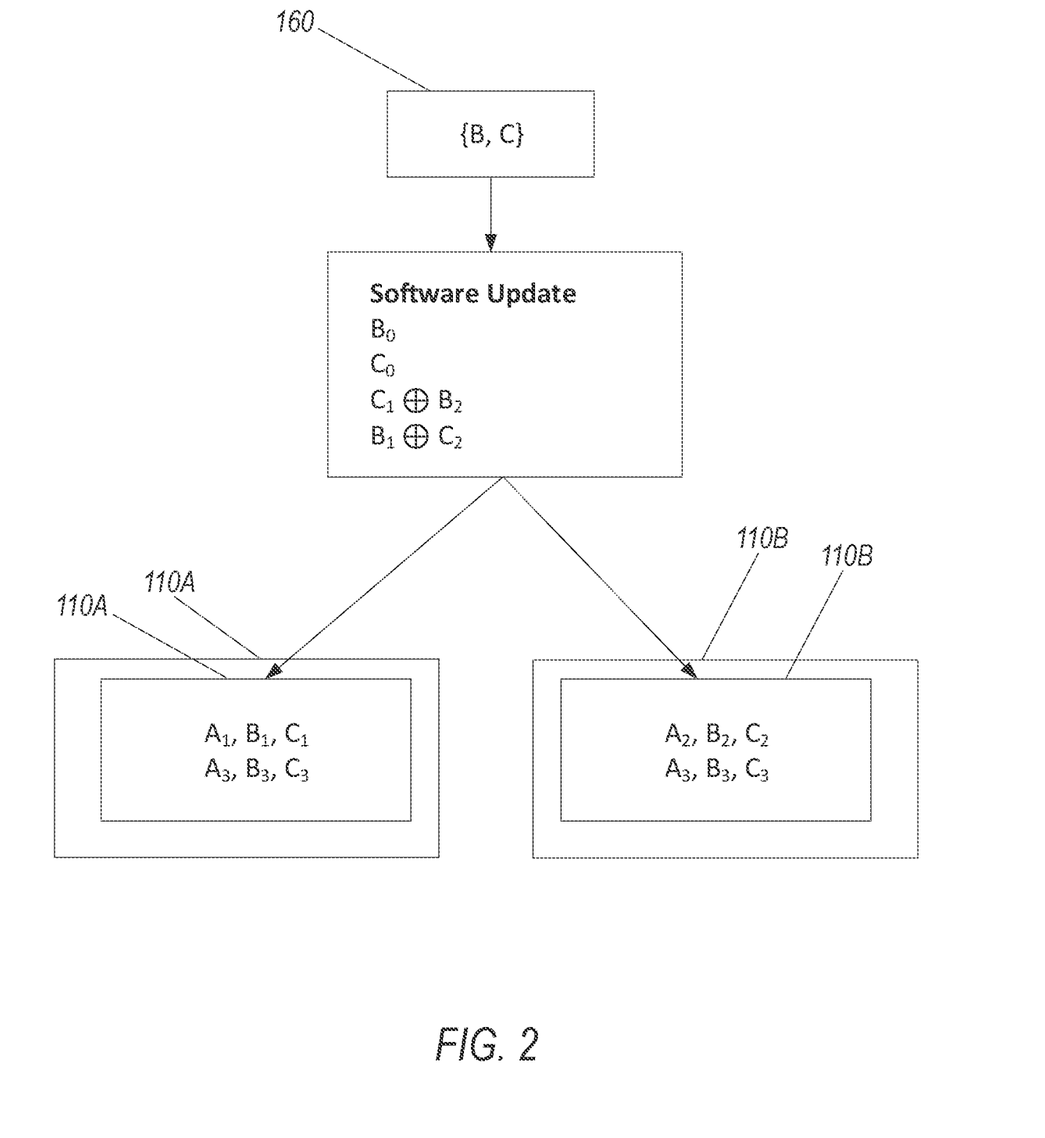
FIG. 2 is an example block diagram illustrating an example of updating operational features of software in a computer.

FIG. 2 is an example block diagram illustrating storing and updating example sets of software data A, B, C in computers 110. As seen in FIG. 2, a server computer can store current sets of software data B, C, and can provide updates of the sets B, C to computers 110 that include portions of software data A, B, C.

Software data, in the present context, is digital data including program instructions executable by a computer processor, typically in the form of object code, i.e., compiled executable code, etc. Software data may be stored in a binary format, for example. In one example, a set of software data is executable computer code for a computer program or application. Further, an example of a set of software data is a set or package of files, i.e., the respective files in a package of software data are respective portions of the package (i.e., set_of software data.

A set of software data, e.g., embodying a program or application, can be used to provide an operational feature of a machine or system. An operational feature of a machine or system, e.g., a vehicle 105, means functionality provided by executing software data (i.e., computer-executable instructions) to perform an action by receiving input data and outputting output data based on the received input data. A few of many possible examples of operational features include actuating movement of a machine, such as a robot, aerial drone, vehicle 105, etc., actuating communications, e.g., in a network device such as a gateway or router, or in a communications interface 140, actuating a display (e.g., in a vehicle 105 information or entertainment system), etc.

In the present context, updating an operational feature includes (i) replacing existing software data of an operational feature in a computer 110 with received software data for the respective operational feature, e.g., upgrading from a first version to a second version, and/or (ii) adding a new operational feature to the computer 110. A computer 110 typically includes a reprogramming operational feature for adding, removing, and/or updating an operational feature of the computer 110. Reprogramming includes writing software data in a section of computer 110 memory from which the computer 110 is programmed to perform an operational feature.

A set of software data for an operational feature may be divided into multiple portions, e.g., files. In the preceding paragraph and throughout this document, the notation of the form, $A_{0, \ldots, n}$ represents a portion of a set of software data A, that is, an application or program package comprising a set of portions (e.g., files) with cardinal indices 0 to n includes respective portions $A_0, \ldots, A_n$. In the example of FIG. 2, sets A, B, and C of software data includes respective first, second, third, and fourth portions $A_0, A_1, A_2, A_3$; $B_0, B_1, B_2, B_3$; and $C_0, C_1, C_2, C_3$. Note that each of the sets A, B, C are illustrated herein with a same number of portions, but this is simply for ease of illustration and the number of portions in respective sets of software data could be, and likely would be in some implementations, different.

To facilitate providing an update to a computer 110 included in a machine or system such as a vehicle 105, one or more portions of a set of software data included in the update can be prefetched. "Prefetched" in the present context means that software data has been transferred to the computer 110 at a time prior to a time of an update, e.g., a wired data transfer at a production facility of the computer 110. In one example, a software portion may be selected for prefetching based on various rules: (i) when an expected time of release of an operational feature is not more than a predetermined time, e.g., 6 months, from a date production or service of a vehicle 100, (ii) when software portions fit in an available cache memory of the vehicle 100 computer 110, and/or (iii) when the operational feature is needed based on a current or upcoming time or expected need, e.g., a remote start operational feature may be prefetched when a vehicle 100 is produced or being serviced in fall or winter. With reference to FIG. 2, software portions $A_1, B_1, C_1, A_3, B_3, C_3$ of sets A, B, and C, respectively, are prefetched in the computer 110A, and portions $A_2, B_2, C_2, A_3, B_3, C_3$ of sets A, B, and C, respectively, are prefetched in the computer 110B. Portions $A_0, B_0, C_0$ of sets A, B, and C, of the software data are stored in the server computer 160, but not in any of the computers 110A, 110B. Portions $A_3, B_3, C_3$ are stored in both of the computers 110A, 110B.

The server computer 160 can store, for respective computers 110, what is referred to herein as "status data," which means a record of sets of software data maintained in respective computers 110 and a record of portions of software data for updates that are prefetched in respective computers 110. For example, a computer 110 may be programmed to send status data to the server computer 160.

Additionally or alternatively, the server computer 160 may store status data for a computer 110, e.g., listing prefetched portions of software expected in a computer 110 memory, e.g., as specified by a computer 110 manufacturer. To provide an update of a set of software data to a computer 110, the computer 110 must be provided with portions of the set of software data needed for the update that it does not currently store, i.e., that were not prefetched, but, advantageously, need not be provided with portions that have been prefetched. For example, referring to FIG. 2, the set B of software data includes portions $B_0$, $B_1$, $B_2$, $B_3$. Thus, to update the set of software data B in the computer 110A, the computer 110A lacks the portions $B_0$, $B_2$. In another example, to update the software data set C in the second computer 110B, the computer 110B lacks the portions $C_0$, $C_1$.

The server computer 160 can be programmed to identify prefetched portions of software data in a computer 110 for performing an update of software data for an operational feature, and to identify portions of software data not stored by the computer 110 but needed for the update. Yet further, the server computer 160 can be programmed to determine if portions of software data needed for the update are stored locally on a second computer 110, or must be provided via a wide area network by the server computer 160. Upon identifying a portion of software not stored locally by either the receiving computer 110 or any second computer 110 on a local network with the receiving computer 110, the server computer 160 can determine and execute an encoding scheme and can then provide a missing portion or portions of software data for an update according to the encoding scheme.

In one example, the server computer 160 can provide a portion or portions of software data for an update by transmitting or sending data intended for a plurality of receivers. In one example, the server computer 160 may broadcast the message to a plurality of receiving computer 110, e.g., in a geographical area. In some examples, a broadcast message may include data specifying for which receiver(s) (e.g., computers 110) the message is intended, e.g., by transmitting a list of identifiers of target receivers, as discussed below. The server computer 160 may broadcast data to a plurality of computers 110 via a wireless communication network such as WAN, DSRC, mobile communication network, etc.

In the example of FIG. 2, the server computer 160 is providing updates to computers 110A, 110B for sets of software data B, C. Because none of the computers 110 on a vehicle 105 network have portions $B_0$, $C_0$ of the sets B, C, these portions are provided in a transmitted message without being encoded as described herein. However, software portions $B_1$, $C_1$, $B_3$, and $C_3$ of sets B and C are stored, e.g., prefetched, in the computer 110A, and portions $B_2$, $C_2$, $B_3$, and $C_3$ of sets B and C, respectively, are stored, e.g., prefetched, in the computer 110B. In other words, portions $B_1$ and $C_1$ are stored on the computer 110A but not the computer 110B, whereas the portions $B_2$ and $C_2$ are stored on the computer 110B but not the computer 110A. Advantageously, two different portions of software data can be combined according to an encoding scheme that results in a string of bits that is no longer than a longest one of the two portions (a technique for addressing differences in sizes of bit strings to be encoded is discussed below).

The encoding scheme can include an XOR (exclusive or) function An XOR operation (represented herein with the $\oplus$ symbol) receives as input two binary values and outputs a 1 if the inputs are different and a 0 if the inputs are the same, as shown in Table 1:

TABLE 1

| Input 1 ($I_1$) | Input 2 ($I_2$) | XOR Output ($I_1 \oplus I_2$) |
|---|---|---|
| 1 | 1 | 0 |
| 1 | 0 | 1 |
| 0 | 1 | 1 |
| 0 | 0 | 0 |

That is, an XOR function can be applied to the two portions of software data, i.e., strings of bits. Further, the result or output of the XOR function can be more efficiently send than sending each of the inputs because the output of the XOR function is half the length of the two inputs together. In examples discussed herein, output of an XOR function can encode to portions of software data, and can then be supplied to respective computers 110 on a local network such as a vehicle 105 network where each of the computers 110 needs one of the encoded portions of software data, and has the other encoded portion of software data prefetched. The receiving computer 110 can then decode the XORed string using the prefetched portion to obtain the missing portion of software data.

For example, as illustrated in FIG. 2, the server computer 160 can generate two sets of encoded data (1) $C_1 \oplus B_2$, and (2) $B_1 \oplus C_2$, which can then be sent and received in the first and second computers 110A, 110B. The first computer 110A can be programmed to decode the second portion $B_2$ from the received encoded data $C_1 \oplus B_2$, to update the software data set B of the first computer 110A based on the stored first portion $B_1$ and the decoded second portion $B_2$, and to operate the first computer 110A based on the updated operational feature B. For example, a set of encoded data $C_1 \oplus B_2$ is a set of data of binary digits encoding which digits differ between the software portions $B_2$, $C_1$. Thus, if a computer 110A includes the software portion $C_1$, the computer 110A can obtain the software portion $B_2$ from the encoded data $C_1 \oplus B_2$. That is, the computer 110A can generate the software portion $B_2$ as $B_2=(C_1 \oplus B_2) \oplus C_1$.

Similarly, if a computer 110B includes the software portion $B_2$, the computer 110A can obtain the other software portion $C_1$ from the encoded data $C_1 \oplus B_2$. That is, the computer 110A can generate the software portion $C_1$ as $C_1=(C_1 \oplus B_2) \oplus B_2$.

Advantageously, by sending the encoded data $C_1 \oplus B_2$, the server computer 160 reduces an amount of data that is sent compared to sending each of the portions $B_2$, $C_1$. Prefetched software portions and the software portions (whether non-encoded or encoded) received via wireless communication are typically stored in a cache or other reserved memory of a computer 110 prior to updating a respective operational feature of the computer 110. In other words, a computer 110 needs sufficient cache memory to store the portions of an operational feature in order to reprogram the respective feature of the computer 110. L represents a size of cache memory, e.g., in a vehicle 100 computer 110, that can be used for prefetching a set of software data. Equation (1) specifies a volume of data $R_1L$ to be transmitted in order to update or install software data of operational features B, C. L represents a size of cache memory area for storage of software data. The notation |x| means a size, e.g., 100 kilobytes (KB) of a software portion x.

$$R_1L=|B_0|+|C_0|+|C_1 \oplus B_2|+|B_1 \oplus C_2| \qquad (1)$$

Equation (2) provides an example technique for determining a size of, e.g., software portion $B_\sigma$. M×L indicates a size of computer 110 cache memory. N is a number of portions to be updated. σ is an index of software portion, e.g., $B_1$. With reference to example system 100 shown in FIG. 2, M is 2, N is 3, and σ is any of {0, 1, 2, 3}.

$$|B_\sigma| \approx \left(\frac{M}{N}\right)^{|\sigma|}\left(1-\frac{M}{N}\right)^{N-|\sigma|} \quad (2)$$

With reference to Equation (2), approximations (3)-(6) determine approximate sizes of data that is sent by the server computer 160. Thus, with reference to Equation (1), $R_1L$ can be calculated based on the approximations (3)-(6).

$$|B_0| \approx (1-\tfrac{1}{3})^2 L \quad (3)$$

$$|C_0| \approx (1-\tfrac{1}{3})^2 L \quad (4)$$

$$|C_1 \oplus B_2| \approx \tfrac{1}{3}(1-\tfrac{1}{3})^2 L \quad (5)$$

$$|B_1 \oplus C_2| \approx \tfrac{1}{3}(1-\tfrac{1}{3})^2 L \quad (6)$$

In one example, the computer 160 is programmed to identify one or more operational features which are not included in an update plan and then to send instructions to the computers 110 to remove the portion(s) of the identified operational feature from the computer 110 memory, thereby gaining memory to store portions of one or more operational features that need to be installed or updated. An update plan may be stored in a server computer 160, and includes data specifying a time for an update and/or installation of software data for a plurality of operational features. A plan may be stored in a table or the like specifying a date of update of respective operational features, e.g., sets of software data A, B, C, D, etc.

As discussed with respect to Table 1, encoding may be performed by applying an XOR function to two input software portions $I_1$, $I_2$. Inasmuch as the XOR function is performed bit by bit, i.e., compares respective bits in two strings of bits, input software portions should have a same size, i.e., a same number of bits. However, in some examples, sizes of respective software portions may be different. To resolve differences in sizes of software portions, the server computer 160 may be programmed to adjust a size of a first software portion to a size of a second software portion so that an XOR function can be meaningfully applied. For example, upon determining that a size of a first portion $B_1$ is less than that of a second portion $C_2$, the server computer 160 could adjust the first portion $B_1$ by padding the portion $B_1$, i.e., adding dummy data to the end of the portion $B_1$ to achieve a same size, i.e., number of bits, as the portion $C_2$. The server computer 160 could then apply the XOR function to encode the first portion $B_1$ and the second portion $C_2$, whereupon, when the encoded string of bits is decoded, a number of padded bits, and their values (e.g., all zeros) could be provided to a decoding computer 110. For example, assume that the software portion $B_1$ is an array or string of 100 bits and the software portion $C_2$ is an array or string of 110 bits, then the server computer 160 may be programmed to add 10 zero bits at the end (or, alternatively, padding could be at some other location such as the beginning) of the software portion $B_1$. Thus, when generating encoded data $B_r \oplus C_2$, sizes of portions $B_1$, $C_2$ will be the same. In some examples (not illustrated in FIG. 2), the server computer 160 may update only one software data set, e.g., data set A. In such an example, the server computer 160 may be programmed to generate encoded data $A_1 \oplus A_2$. The first computer 110 may be programmed to decode the software portion $A_2$ based on the prefetched software portion A, and the received encoded data $A_1 \oplus A_2$. The second computer 110B may be programmed to decode the software portion $A_1$ based on the prefetched software portion $A_2$ and the received encoded data $A_1 \oplus A_2$.

Figure 3:
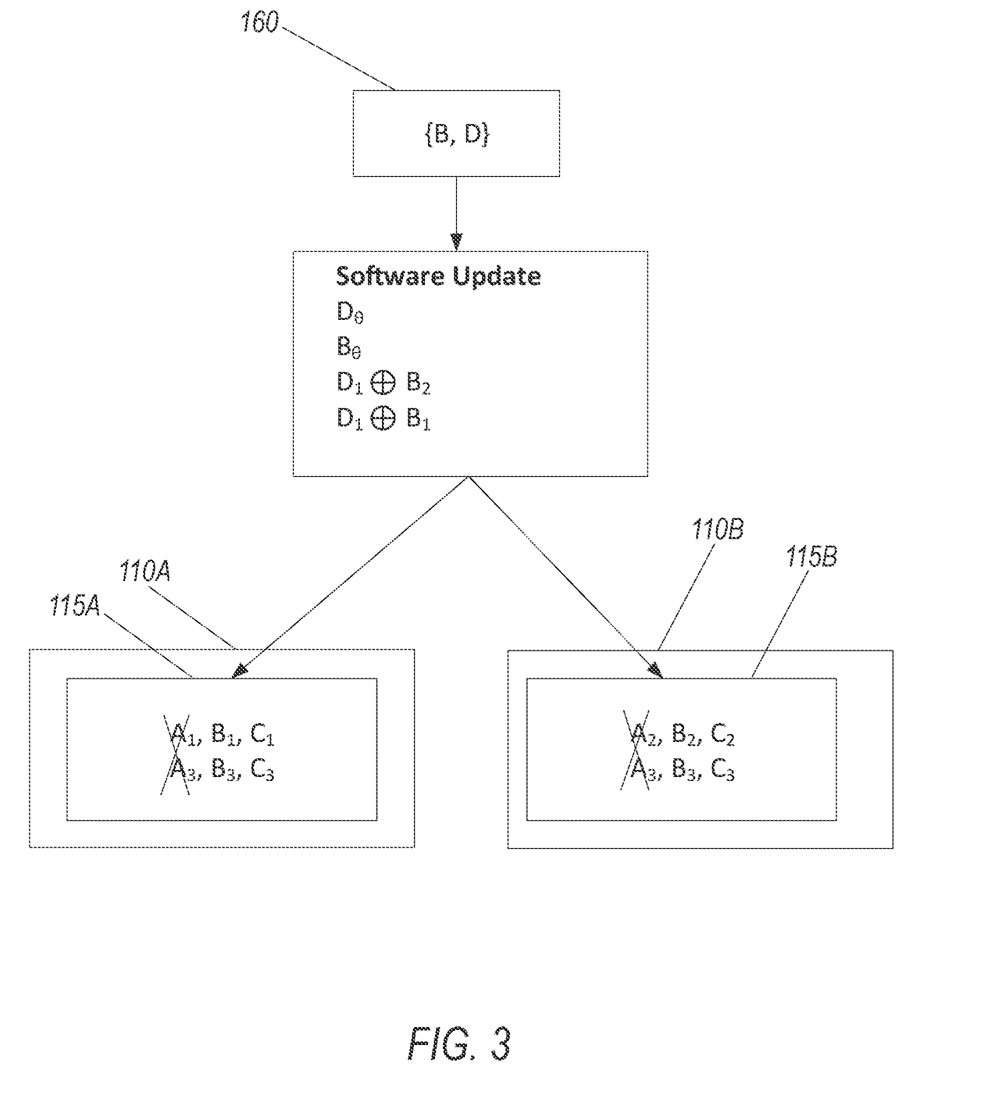
FIG. 3 is another example block diagram for updating an operational feature and installing a new operation feature of software in a computer.

In an example illustrated in FIG. 3, the computer 110A stores portions $A_1$, $A_3$, and the computer 110B stores portions $A_2$, $A_3$. The server computer 160 may communicate through wireless communication, to the computers 110A, 110B. Upon determining that the software data set A is not planned for an update and the computers 110A, 110B lack sufficient space to update feature B, the server computer 160 may send via wireless transfer an instruction to the computers 110A, 110B to remove the portions $A_1$, $A_2$, $A_3$. Sending the encoded data $D_1 \oplus B_2$, $D_1 \oplus B_1$ means that a total amount of data sent is advantageously reduced from an amount of data that would be sent without the encoding.

A volume of data sent to update the software data set B and install the software data set D can be determined using Equation (7). Equation (7) is determined based on Equation (2). $R_2L$ represents a volume of data sent to update the software data set B and install the software data set D.

$$R_2L = [(1-\tfrac{1}{3})^2 + \tfrac{1}{3}(1-\tfrac{1}{3})+1)]L \quad (7)$$

For illustrative purposes, in examples discussed with respect to FIGS. 2-3, two computers 110A, 110B are shown. However, the techniques discussed herein may be used for any number of computers 110. In one example, as shown in Table 2, the system 100 may include three computers 110A, 110B, 110C. S setoff software data A includes portions $A_1$, $A_2$, $A_3$. A set of software data B includes portions $B_1$, $B_2$. Table 1 shows which portions are prefetched in each of the computers 110A-110C.

TABLE 2

| Computer | Prefetched portions | Decodable encoded data |
|---|---|---|
| 110A | $A_1$, $B_1$ | $A_2 \oplus B_1$, $A_3 \oplus B_1$ |
| 110B | $A_2$, $B_2$ | $A_2 \oplus B_1$, $A_3 \oplus B_1$ |
| 110C | $A_3$, $B_1$ | $A_2 \oplus B_1$, $A_1$ |

The server computer 160 may be programmed to update software sets A, B of the computers 110A-110C. The computer 160 may be programmed to determine pairs of software portions for encoding with an XOR function based on determining the received data is decodable by the receiving computer 110A-110C. An additional criterion could be a determination that a volume of encoded data for sending is minimized. For example, with respect to Table 2, the computer 160 may be programmed to determine that the encoded data $A_3 \oplus B_1$ is decodable by the computer 110B by assigning a transmitted sequence that specifies sending the encoded data $A_2 \oplus B_1$ prior to the encoded data $A_3 \oplus B_1$. Based on this sequence being specified, upon receiving the encoded data $A_2 \oplus B_1$, the computer 110B can decode the encoded data to obtain the portion $B_1$. Then, upon receiving the encoded data $A_3 \oplus B_1$ the computer 110B can decode the encoded data to obtain the portion $A_3$, thereby advantageously reducing an amount of bandwidth that would have otherwise been consumed by transmitting encoded data $A_3 \oplus B_2$. The computer 160 may be programmed to optimize the set of encoded data for sending by determining a sequence that reduces the volume of sent data.

As shown in Table 2, some of the portions of software data, e.g., the portion $A_1$ may be sent without encoding. The computer 160 may be programmed to send one or more portions of software data, e.g., upon determining that encoding with another software portion may not reduce volume of sent data needed to update or install the planned software data.

Figure 4:
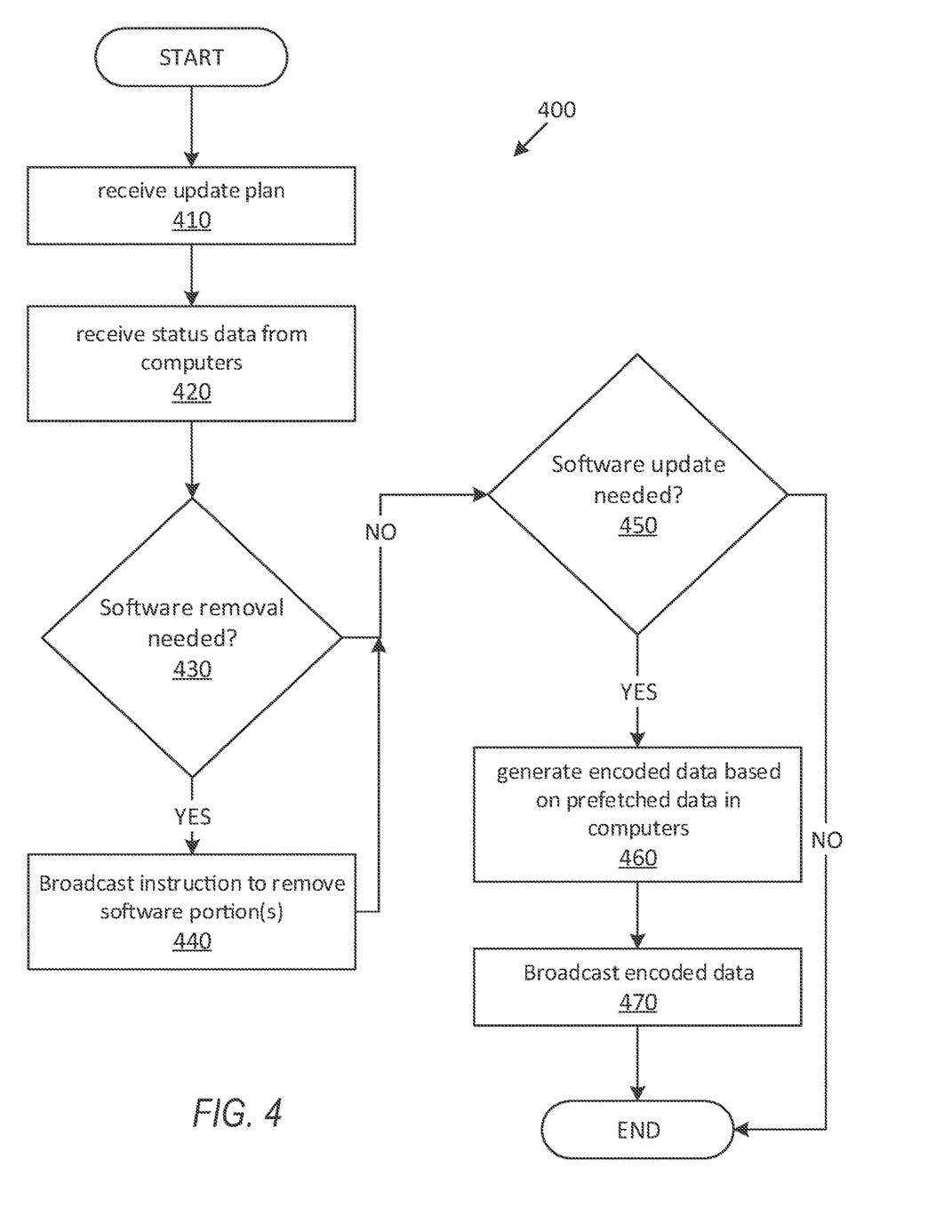
FIG. 4 is a flowchart of an exemplary process for operating a server device.

FIG. 4 is a flowchart of an exemplary process 400 for operating the server device. A server computer 160 may be programmed to execute blocks of the process 400.

The process 400 begins in a block 410, in which the computer 160 receives an update plan. The computer 160 may store the update plan in a computer 160 memory and/or receive data including the update plan from a remote computer. For example, a software vendor or provider may provide an update plan. The update plan may be in form of a table or the like specifying a set or sets of software data to be updated, a date for an upgrade and/or install of new software data for a plurality of operational features.

Next, in a block 420, the computer 160 receives from computers 110 or retrieves, e.g., from a computer 160 memory, status data. For example, the computer 160 may receive status data from the computers 110A specifying software portions for update or install of one or more operational features. For example, as shown in FIG. 2, data received from the computer 110A may specify that software portions $A_1$, $B_1$, $C_1$, $A_3$, $B_3$, $C_3$ are stored in the computer 110A.

Next, in a decision block 430, the computer 160 determines whether one or more software portions should be removed from computer(s) 110. As shown in example block diagram of FIG. 3, the computer 160 may determine that software portions $A_1$, $A_3$ should be removed due to, e.g., (i) lack of space in computer 110 memory 115 to store software data for operational feature D, and/or (ii) software update plan specifies no update of software data set A. If the computer 160 identifies one or more software portions to be removed from computer(s) 110, then the process 400 proceeds to a block 440; otherwise the process 400 proceeds to a decision block 450.

In the block 440, the computer 160 sends a message instructing the computer(s) 110 to remove the software portions $A_1$, $A_3$ of the identified software data set A from memory 115. The message may include a list of operational features, e.g., an identifier of software data set A, and a list of applicable computers 110, e.g., vehicle 100 model identifier, vehicle 100 computer 110 identifier, etc. Following the block 440, the process 400 proceeds to the decision block 450.

In the decision block 450, which can be reached from the blocks 430, 440, the computer 160 determined whether a software update and/or install is needed. The computer 160 may be programmed to determine, based on the update plan and the received status data, whether sending of software data to the computers 110 is needed. If the computer 160 determine that a software update is needed, then the process 400 proceeds to a block 460; otherwise the process 400 ends, or alternatively returns to the block 410 although not shown in FIG. 4.

In the block 460, the computer 160 generates encoded data based on the prefetched data in the computer(s) 110 and the software update plan. The computer 160 may be programmed to identify (i) software portion(s) that are not on any of the computers 110, e.g., portions $B_0$, $C_0$ (see FIG. 2), (ii) portions that are on individual computers 110 but not on all of the computers 110, e.g., portions $B_1$, $C_1$, (iii) portions that are available on each of the computers 110, e.g., portions $B_3$, $C_3$, thereby determining pairs of software portions for encoding such that a minimum amount of bandwidth is used for transmitting the data wirelessly to the computers 110. For example, as shown in FIG. 2, the computer 160 may be programmed to generate encoded data $C_1 \oplus B_2$, $B_1 \oplus C_2$ based on a plan to update software data sets B, C.

Next, in a block 470, the computer 160 sends the encoded data, e.g., $C1 \oplus B2$, $B1 \oplus C2$, via wireless transfer. As discussed with reference to FIGS. 2-3, the computer 160 may be programmed to additionally send not-encoded software portions, e.g., portions $B_0$, $C_0$. Following the block 470, the process 400 ends, or alternatively returns to the block 410, although not shown in FIG. 4.

Figure 5:
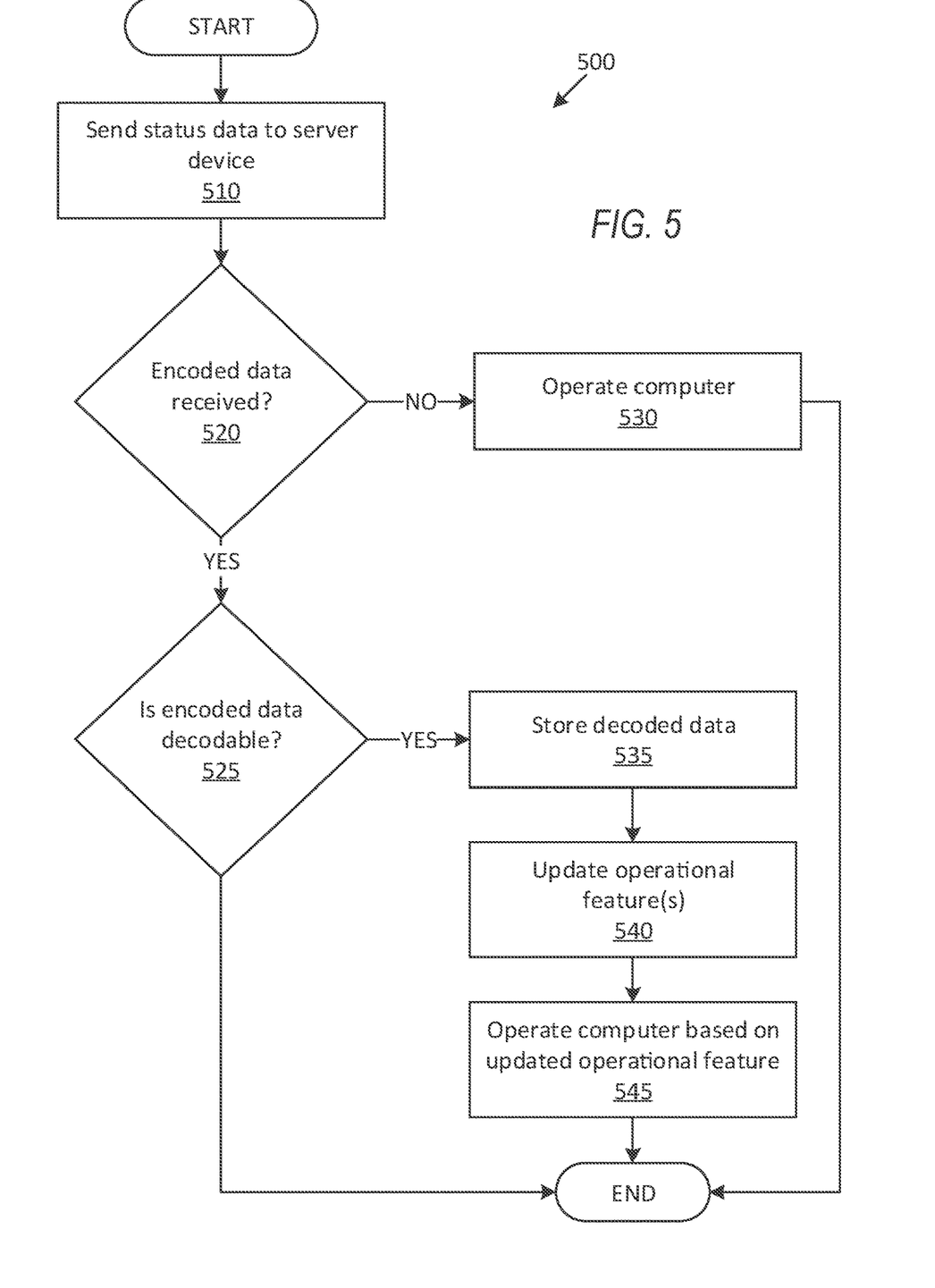
FIG. 5 is a flowchart of an exemplary process for operating a computer receiving updated software data.

FIG. 5 is a flowchart of an exemplary process for operating a computer receiving updated software data. A computer 110 can be in a vehicle 105, a mobile robot, a manufacturing facility, etc., and may be programmed to perform blocks of the process 500.

The process 500 begins in a block 510, in which the computer 110 sends status data to a server computer 160 typically at least in part wirelessly. The computer 110 may be programmed to determine status data, as defined above, by creating a list of identifiers of prefetched stored software data in the computer 110 memory 115. Alternatively, the computer 110 may be programmed to send status data upon receiving a request for status data from the server computer 160.

Next, in a decision block 520, the computer 110 determines whether encoded data is received from the server computer 160. If the computer 110 determines that encoded data is received, then the process 500 proceeds to a decision block 525, otherwise the process 500 proceeds to a block 530.

In the decision block 525, the computer 110 determines whether the received encoded data is decodable. The computer 110 may be programmed to determine that encoded data is decodable upon determining that (i) the encoded data is applicable to the computer 110, e.g., based on an identifier as a model number, etc., of the computer 110 included in the received data, (ii) and based on the prefetched software portions, the received encoded data can be decoded. For example, with reference to FIG. 2, if the computer 110A includes the software portion $C_1$, the computer 110A can decode (or recover) the other software portion $B_2$ from the encoded data $C_1 \oplus B_2$. The computer 110A can generate the software portion $B_2$ as $B_2=(C_1 \oplus B_2) \oplus C_1$. If the computer 110 determines that the received encoded data is decodable, then the process 500 proceeds to a block 535; otherwise the process 500 ends, or alternatively returns to the block 510, although not shown in FIG. 5.

In the block 530, the computer 110 operates, e.g., the vehicle 100, a robot, etc. The computer 110 may be programmed to provide one or more software data sets A, B, C, etc. Following the block 530, the process 500 ends, or alternatively returns to the block 510, although not shown in FIG. 5.

In the block 535, the computer 110 decodes and stores the decoded software portions. For example, with reference to FIG. 2, the computer 110 may be programmed to decode the software portion $B_2$ and store the decoded software portion $B_2$ in the computer 110A memory 115A.

Next, in a block 540, the computer 110 updates and/or installs operational features based on the decoded data. The computer 110 may be programmed to determine that a feature can be updated or installed upon determining that each of the portions of the software data for reprogramming the respective feature is stored in the computer 110 memory 115. For example, with respect to FIG. 2, the computer 110 may update the software dataset B using the software portions $B_0$, $B_3$, $B_1$, $B_2$. With reference to FIG. 3, the computer 110B may install the software data set D using the software portions $D_0$, $D_1$, $D_2$.

Next, in a block 545, the computer 110 operates based on the updated and/or newly installed operational feature(s). For example, with respect to FIG. 2, the computer 110 may be programmed to operate based on updated software data set B or new installed software data set D, as shown in FIG. 3. Following the block 545, the process 500 ends, or alternatively returns to the block 510, although not shown in FIG. 5.

Unless indicated explicitly to the contrary, "based on" means "based at least in part on" and/or "based entirely on."

Computing devices as discussed herein generally each includes instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computing device is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, nonvolatile media, volatile media, etc. Nonvolatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CDROM, DVD, any other optical medium, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a nonprovisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising:
a server computer, programmed to:
determine an update plan identifying a plurality of portions of software data to be updated in a plurality of computers including a first computer and a second computer;
obtain status data from the respective computers in the plurality of computers, wherein the status data for a respective computer identifies portions of the software data maintained in the respective computer;
based on determining from the status data that the first portion of the software data for updating an operational feature of the first computer is stored in the first computer, that the second portion of the software data is stored in the second computer, and that a third portion is lacking in both the first computer and the second computer, encode the first portion and the second portion to generate encoded data; and
send the encoded data via wireless data transfer to the first and second computers along with the third portion that is unencoded; and
the first computer, programmed to:
decode the second portion from the received encoded data;
update the operational feature of the first computer based on the stored first portion and the decoded second portion; and
operate the first computer based on the updated operational feature.

2. The system of claim 1, wherein the first computer is in a first vehicle and the operational feature is a vehicle operation feature.

3. The system of claim 1, wherein the server computer is further programmed to encode the first portion and the second portion by applying an XOR operation to the first portion and the second portion.

4. The system of claim 1, wherein the server computer is further programmed to:
upon determining that a first portion size differs from a second portion size, adjust at least one of the first and second portions by adding dummy data; and
then encode the first portion and the second portion using the adjusted at least one of the first and second portion.

5. The system of claim 1, wherein the server computer is further programmed to:
upon determining that (i) the first computer stores a fourth portion that is a portion of second software data for updating a second operational feature in a first computer memory, and (ii) the first computer memory lacks a space to store the second portion, transmit an instruction to the first computer to remove the fourth portion of the second software data from the first computer memory.

6. The system of claim 1, wherein the server computer is further programmed to:

upon determining that (i) the first computer stores a fourth portion that is a portion of second software data for updating a second operational feature in a first computer memory, and (ii) a software update plan does not specify an update of the second software data, send a message including an instruction to remove the fourth portion of the second software data from the first computer memory.

7. The system of claim 1, wherein the first computer is in a first vehicle, and the second computer is in a second vehicle.

8. A server computer, comprising a processor and a memory, the memory storing instructions executable by the processor to:
   determine an update plan identifying a plurality of portions of software data to be updated in a plurality of computers including a first computer and a second computer;
   then obtain status data from the respective computers in the plurality of computers, wherein the status data for a respective computer identifies portions of the software data maintained in the respective computer;
   based on determining from the status data that the first portion of the software data for updating an operational feature of the first computer is stored in the first computer, that the second portion of the software data is stored in the second computer, and that a third portion is lacking in both the first computer and the second computer, encode the first portion and the second portion to generate encoded data; and
   send the encoded data via wireless data transfer to the first and second computers along with the third portion that is unencoded;
   wherein the first computer is programmed to decode the second portion from the received encoded data and update the operational feature of the first computer based on the stored first portion and the decoded second portion.

9. The server computer of claim 8, wherein the instructions further include instructions to encode the first portion and the second portion by applying an XOR operation to the first portion and the second portion.

10. The server computer of claim 8, wherein the instructions further include instructions to:
    upon determining that a first portion size differs from a second portion size, adjust at least one of the first and second portions by adding dummy data; and
    then encode the first portion and the second portion using the adjusted at least one of the first and second portion.

11. The server computer of claim 8, wherein the instructions further include instructions to:
    upon determining that (i) the first computer stores a fourth portion that is a portion of second software data for updating a second operational feature in a first computer memory, and (ii) the first computer memory lacks a space to store the second portion, transmit an instruction to the first computer to remove the fourth portion of the second software data from the first computer memory.

12. The server computer of claim 8, wherein the instructions further include instructions to:
    upon determining that (i) the first computer stores a fourth portion that is a portion of second software data for updating a second operational feature in a first computer memory, and (ii) a software update plan does not specify an update of the second software data, send a message including an instruction to remove the fourth portion of the second software data from the first computer memory.

13. The server computer of claim 8, wherein the first computer is in a first vehicle, and the second computer is in a second vehicle.

14. A method, comprising:
    determining an update plan identifying a plurality of portions of software data to be updated in a plurality of computers including a first computer and a second computer;
    then obtaining status data from the respective computers in the plurality of computers, wherein the status data for a respective computer identifies portions of the software data maintained in the respective computer;
    based on determining from the status data that the first portion of the software data for updating an operational feature of the first computer is stored in the first computer, that the second portion of the software data is stored in the second computer, and that a third portion is lacking in both the first computer and the second computer, encoding, in a server computer, the first portion, the second portion to generate encoded data;
    sending, from the server computer, the encoded data via wireless data transfer to the first and second computers along with the third portion that is unencoded;
    decoding, in the first computer, the second portion from the received encoded data;
    updating the operational feature of the first computer based on the stored first portion and the decoded second portion; and
    operating the first computer based on the updated operational feature.

15. The method of claim 14, wherein the encoding includes applying an XOR operation to the first portion and second portions of the software data.

16. The method of claim 14, further comprising:
    upon determining that a first portion size differs from a second portion size, adjusting at least one of the first and second portions by adding dummy data; and
    then encoding the first portion and the second portion using the adjusted at least one of the first and second portion.

17. The method of claim 14, further comprising:
    upon determining that (i) the first computer stores a fourth portion that is a portion of second software data for updating a second operational feature in a first computer memory, and (ii) the first computer memory lacks a space to store the second portion, transmitting an instruction to the first computer to remove the fourth of the second software data from the first computer memory.

* * * * *

UNITED STATES PATENT AND TRADEMARK OFFICE
CERTIFICATE OF CORRECTION

PATENT NO. : 11,886,865 B2
APPLICATION NO. : 17/233946
DATED : January 30, 2024
INVENTOR(S) : Mohsen Bahrami et al.

It is certified that error appears in the above-identified patent and that said Letters Patent is hereby corrected as shown below:

In the Claims

Claim 17, Column 16, Line 56 replace "remove the fourth of the second" with "--remove the fourth portion of the second--"

Signed and Sealed this
Twelfth Day of March, 2024

Katherine Kelly Vidal
Director of the United States Patent and Trademark Office